(12) United States Patent
Berke et al.

(10) Patent No.: US 6,231,081 B1
(45) Date of Patent: May 15, 2001

(54) SEMITRAILER LANDING GEAR

(75) Inventors: Joseph J. Berke, 2063 Long Lake Shore, West Bloomfield, MI (US) 48323; Charles T. Michael, Troy, MI (US)

(73) Assignee: Joseph J. Berke, West Bloomfield, MI (US)

( * ) Notice: Subject to any disclaimer, the term of this patent is extended or adjusted under 35 U.S.C. 154(b) by 0 days.

(21) Appl. No.: 09/232,242

(22) Filed: Jan. 19, 1999

(51) Int. Cl.⁷ ........................................................ B60S 9/00
(52) U.S. Cl. ........................................ 280/763.1; 254/419
(58) Field of Search ................................ 280/763.1, 764.1, 280/765.1, 766.1; 254/419; 248/632, 633

(56) References Cited

U.S. PATENT DOCUMENTS

| | | | |
|---|---|---|---|
| 3,219,362 | * | 11/1965 | Epstein . |
| 3,666,290 | * | 5/1972 | Dalton et al. ..................... 280/763.1 |
| 3,998,470 | * | 12/1976 | Houston .............................. 280/301 |
| 4,039,206 | * | 8/1977 | Nault ................................ 280/763.1 |
| 4,073,454 | * | 2/1978 | Sauber .............................. 248/188.2 |
| 4,281,852 | * | 8/1981 | Konkle ............................. 280/766.1 |
| 4,421,290 | * | 12/1983 | Frank ................................... 248/558 |
| 4,634,144 | * | 1/1987 | Ringe ................................ 280/763.1 |
| 4,889,362 | * | 12/1989 | Lagsdin ............................ 280/763.1 |
| 4,903,977 | * | 2/1990 | Baxter ................................ 280/475 |
| 5,409,251 | * | 4/1995 | Thorndyke .......................... 280/475 |

FOREIGN PATENT DOCUMENTS 2 207 102 * 1/1989 (GB) .

* cited by examiner

Primary Examiner—Paul N. Dickson
(74) Attorney, Agent, or Firm—Alex Rhodes

(57) ABSTRACT

A semitrailer landing gear shoe for reducing pits, cracks, marks and depressions in pavements and extending the lives of pavements at truck terminals and delivery sites. In a first aspect of the invention, the average stress of a landing gear on a pavement is reduced by attaching enlarged plates to existing landing gear shoe with pairs of brackets and pairs of threaded fasteners. Concentrated stresses are reduced by bonding a compressible pad to lower surface of the enlarged plate. In a second aspect of the invention, average and concentrated stresses are reduced by replacing an existing landing gear shoe with a shoe having an enlarged lower portion and a compressible pad bonded or otherwise attached to the lower portion. Alternate constructions for the improved landing gear shoe and the compressible pad are disclosed.

15 Claims, 5 Drawing Sheets

US 6,231,081 B1

SEMITRAILER LANDING GEAR

FIELD OF THE INVENTION

This invention relates to load carriers and more particularly to a semitrailer landing gear which markedly reduces pits, cracks, marks and depressions in pavements and extends the lives of pavements at truck terminals and delivery sites.

BACKGROUND OF THE INVENTION

One principal drawback of semitrailer landing gears is that they damage and shorten the life of pavements, particularly asphalt pavements. The greatest damage occurs when asphalt pavements are soft during high temperature days, when semitrailers are parked for considerable amounts of time, and when landing gears contact obstacles, such as debris and stones. The damage occurs in the form of pits, cracks, marks and depressions which deteriorate the appearance, collect water, damage seal coats and shorten a pavement's life.

Therefore, it is a principal object of the present invention to eliminate the damage caused by semitrailer landing gears on pavements, reduce the maintenance costs of pavements and extend the lives of pavements and landing gears.

Another object of the present invention is to provide an improved landing gear shoe which can be mounted on existing landing gears.

A further object of the present invention is to provide an improved landing gear plate which can be mounted on existing landing gear shoes and to support additional heavier semitrailer loads.

SUMMARY OF THE INVENTION

The drawbacks and difficulties encountered with prior landing gears are overcome by the present invention. In order to overcome these drawbacks, the present invention substantially reduces the contact forces of a landing gear on a pavement and provides a resilient contact surface which deflects when the landing gear rests on an inclined or irregular surface or on obstacles such as stones, rocks or other hard debris. Another benefit of the invention is that it is easily applied to existing landing gears and landing gear shoes.

In employing the teaching of the present invention, a plurality of alternate constructions can be adopted to achieve the desired capabilities. In this disclosure, some alternate constructions are discussed. However, these embodiments are intended as examples, and should not be considered as limiting the scope of the invention.

The invention broadly comprises a means for reducing pavement stresses which can be substituted for or applied to an existing landing gear shoe. In a first aspect of the invention, an auxiliary landing gear shoe is mounted on an existing landing gear shoe. A resilient pad is adhesively bonded to a lower surface of the auxiliary shoe. In a second aspect of the invention, an existing landing gear shoe is replaced with an improved landing gear shoe. Reducing the need for expensive maintenance and replacements is a financial boon to owners of parking and delivery sites.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

DETAILED DESCRIPTION OF THE PREFERRED EMBODIMENT

Figure 1:
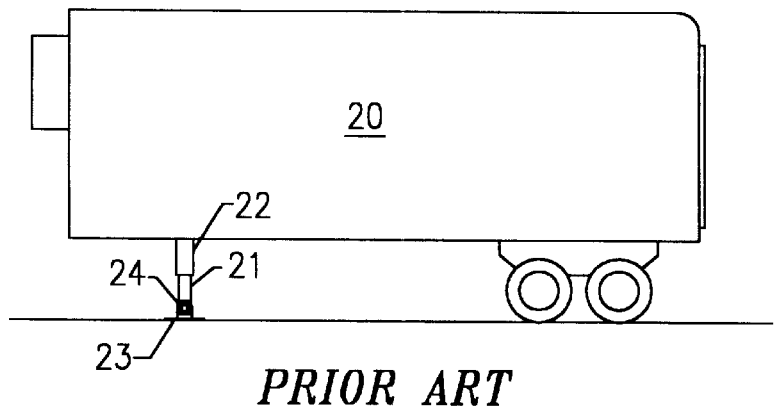
FIG. 1 is a left side view of an existing semitrailer supported on a landing gear.

Referring now to the drawings wherein like numerals designate like and corresponding parts throughout the several views, in FIG. 1 a semitrailer 20 is shown supported on a typical landing gear 21. The typical landing gear 21 is comprised of a pair of telescopic pillars 22 and a shoe 23 pivotally connected with a tubular member 24 to a lower end portion of each of the pillars 22. The axes "A" of the shoes are oriented at right angles to the semitrailer 20 whereby the shoes 23 may pivot in a single direction when they contact inclined surfaces such as frequently found in approaches to loading docks.

Figure 2:
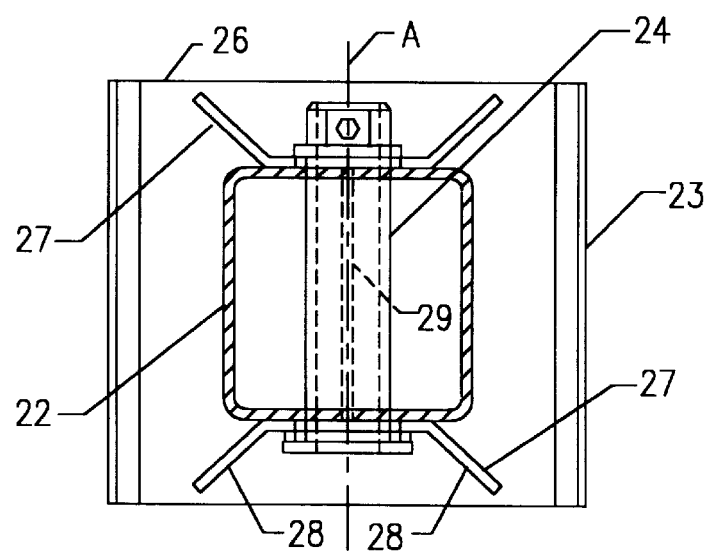
FIG. 2 is a plan view drawn to an enlarged scale of one of the landing gear shoes of FIG. 1.
Figure 3:
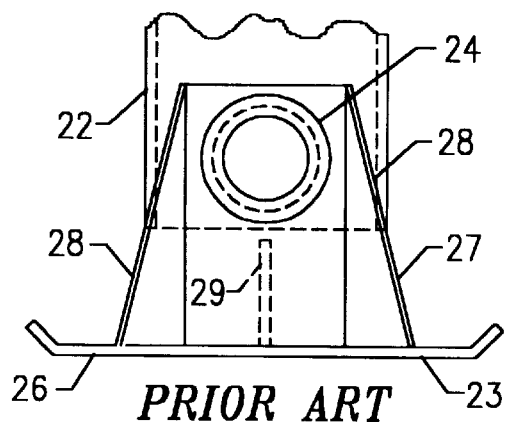
FIG. 3 is a left side view of the landing gear shoe of FIG. 2.

The shoe 23 of the typical landing gear 21 is shown in FIGS. 2 and 3. The shoe 23 is comprised of a generally rectangular stamped base plate 26 and a pair of stamped vertical members 27 welded to the base plate 26. The sides 28 of the vertical members 27 turn outwardly to increase the rigidity of the members 27. In actual practice, the base plate 26 will vary between circular plates and rectangular plates. The diameters of the tubular pivot tubes 24 may also vary between manufacturers.

The thickness of the typical rectangular base plate 26 is about ¼ inch thick and its breadth and length is about 10 inches and 12 inches, respectively, thereby providing an area of about 120 square inches. The plate's forward and rearward edges are bent upwardly by slight amounts. Between the vertical members is a reinforcing plate 29. The apertures 54 in the vertical members 27 receive the tube 24 which pivotally connects the shoe 23 to one of the pillars 22.

Figure 4:
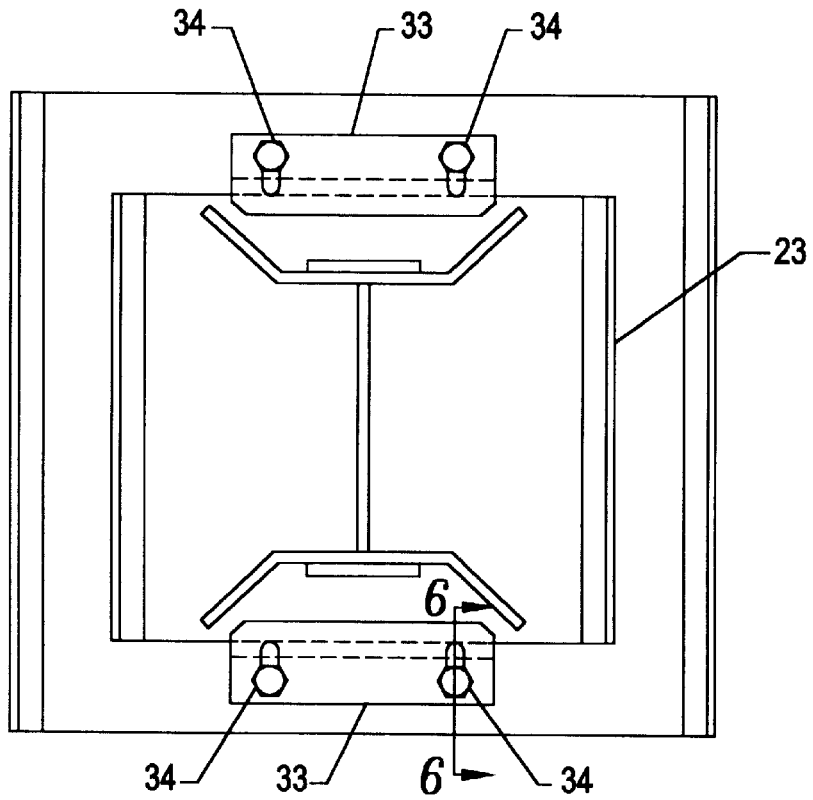
FIG. 4 is a plan view of a first embodiment showing an enlarged auxiliary plate and compressible pad mounted on the landing gear shoe of FIG. 2.
Figure 6:
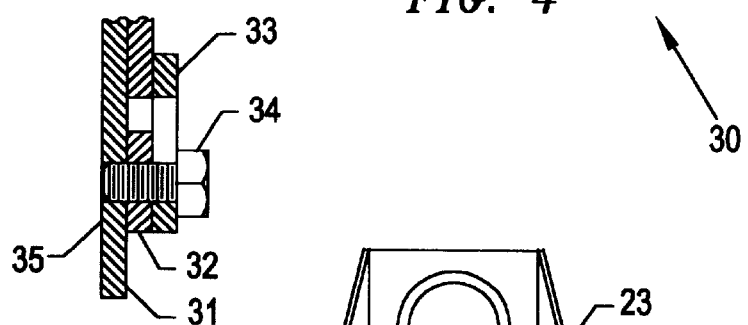
FIG. 6 is an enlarged cross-sectional view taken on the line 6—6 in FIG. 4.
Figure 5:
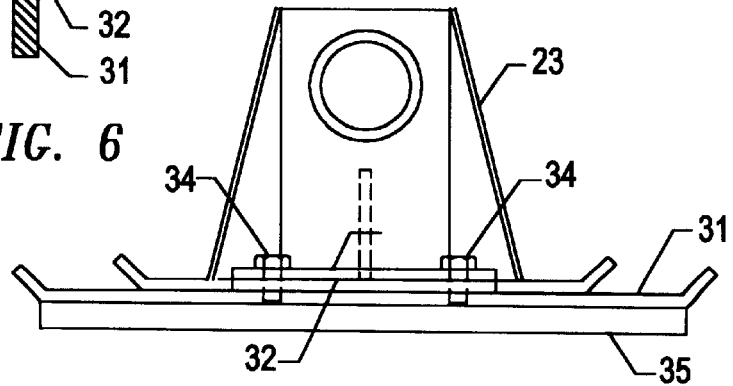
FIG. 5 is a left side view of FIG. 4.

In FIGS. 4 through 6, inclusive, are shown an improved landing gear shoe 30 which embodies the present invention. An auxiliary base plate 31 of about ¼ inch thick is clamped to the typical shoe 23 of FIGS. 2 and 3. The auxiliary base plate 31 extends outwardly from the edges of the typical shoe 23 to increase the contact area, and thereby to reduce the average stress of the shoe 23 on the pavement. A tapping plate 32 is joined to the upper surface of the auxiliary base plate 31 by welding or other suitable means. The auxiliary base plate 31 is joined to the typical shoe 23 with a pair of brackets 33 and pairs of threaded fasteners 34. A rubber, composition, or other flexible type compressible pad 35, such as a urethane pad, is adhesively bonded or otherwise suitably attached to the lower surface of the auxiliary base plate 31. The effect of the enlarged auxiliary base plate 31 is to substantially reduce pavement stresses.

By way of example, a 3 inch overhang of the edges of a 10 inch by 12 inch rectangular base plate reduces average pavement stresses by 38.5 percent. Moreover, the compressible pad 35 reduces the damage to the base plate 31 as well as damage to a pavement when an edge of the shoe contacts a pavement or the base plate 31 contacts an obstacle such as a rock.

Figure 7:
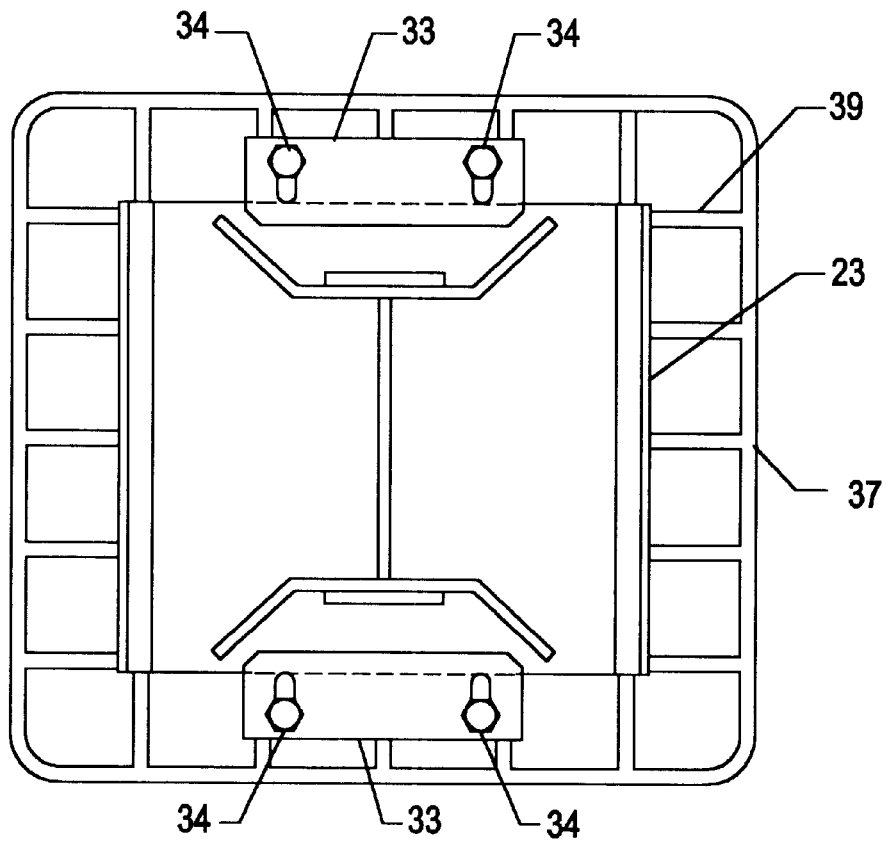
FIG. 7 is a plan view of an alternate embodiment.
Figure 8:
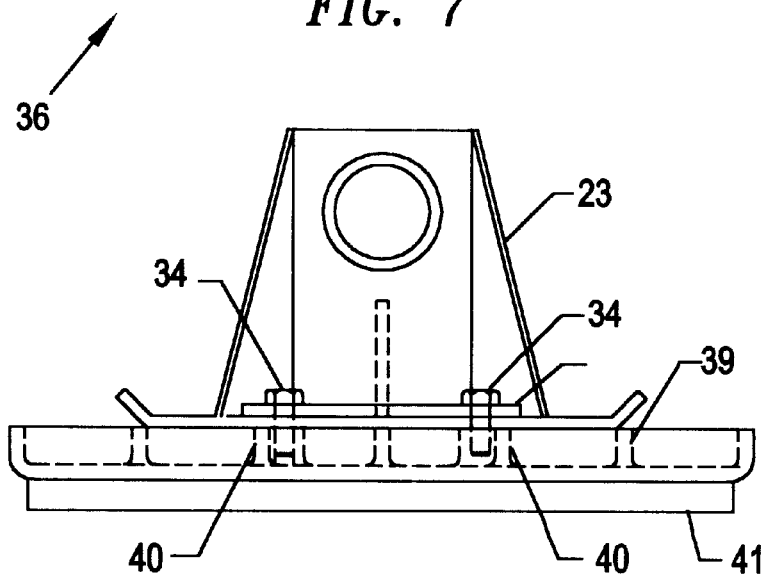
FIG. 8 is a left side view of FIG. 7.

A second embodiment 36 is shown in FIGS. 7 an 8. The second embodiment 36 is similar to the first described embodiment 30 except that an auxiliary base plate 37 is molded from a composite material such as fiber or talc filled polyester, or a metal such as iron or aluminum. The auxiliary base plate 37 has a lower planar portion 38, a plurality of vertical reinforcing ribs 39 and a pair of threaded bosses 40 which extend upwardly from the lower planar portion 38. The molded auxiliary base plate 37 is clamped to the typical landing gear shoe 23 with the pair of brackets 33 and pairs of fasteners 34 which threadably engage the bosses 40. A compressible pad 41 is bonded to a lower surface of the auxiliary base plate 37.

Figure 9:
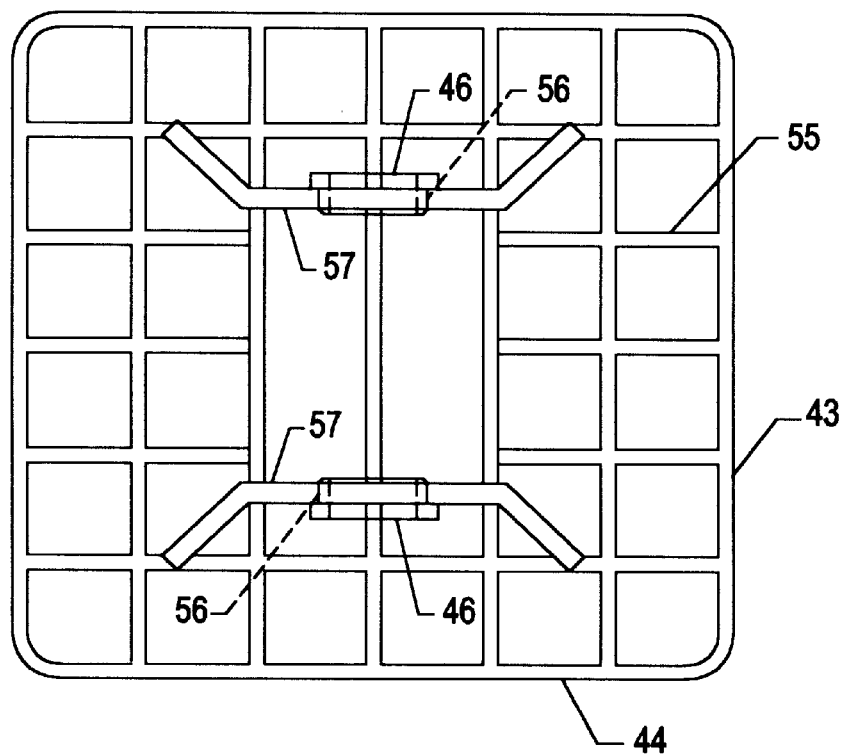
FIG. 9 is a plan view of another alternate embodiment.
Figure 10:
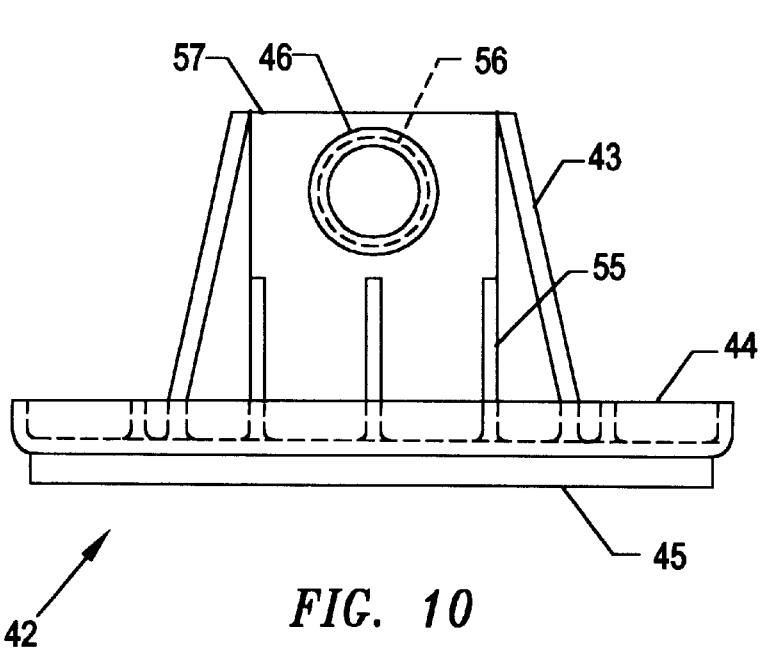
FIG. 10 is a left side view of FIG. 9.

In FIGS. 9 and 10 another embodiment 42 is shown wherein the typical shoe of FIGS. 2 and 3 is replaced with a cast shoe 43 having an enlarged lower portion 44, vertical reinforcing ribs 55 and a compressible pad 45 adhesively bonded or otherwise suitably attached to the lower portion 44 of the shoe 43. A pair of optional adapters 46 engage apertures 56 in vertical walls 57 to accommodate a manufacturer's pivot tube diameter.

Figure 11:
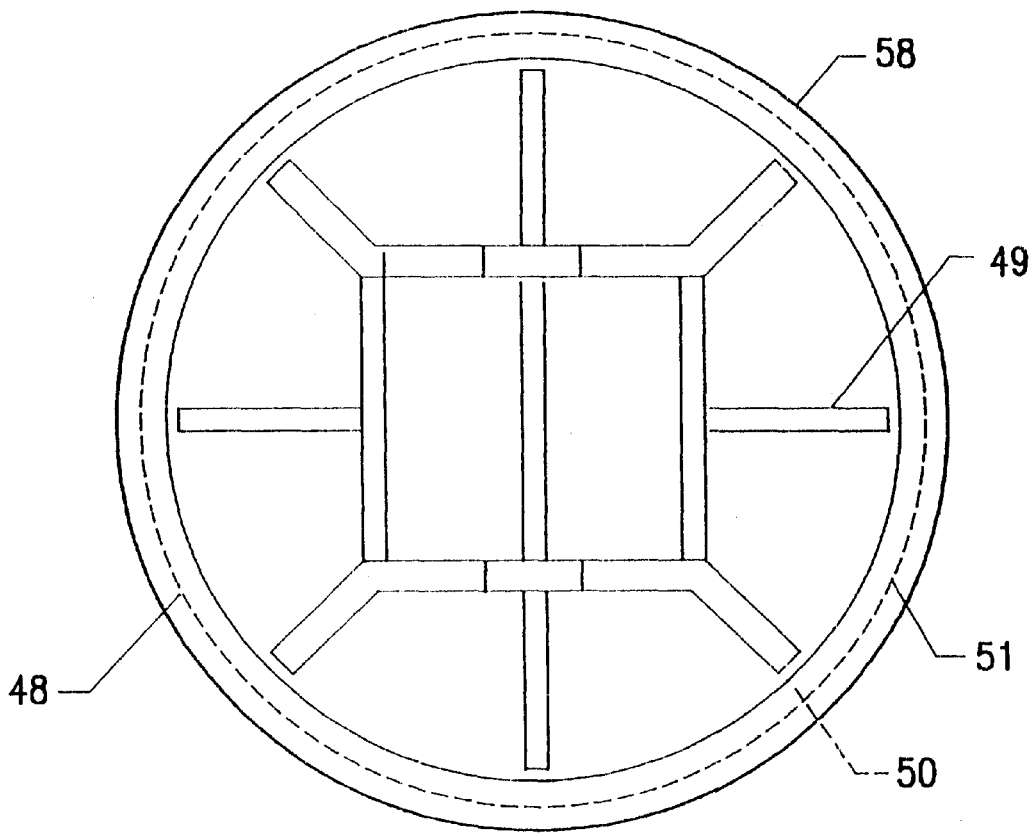
FIG. 11 is a left plan view of another alternate embodiment.
Figure 12:
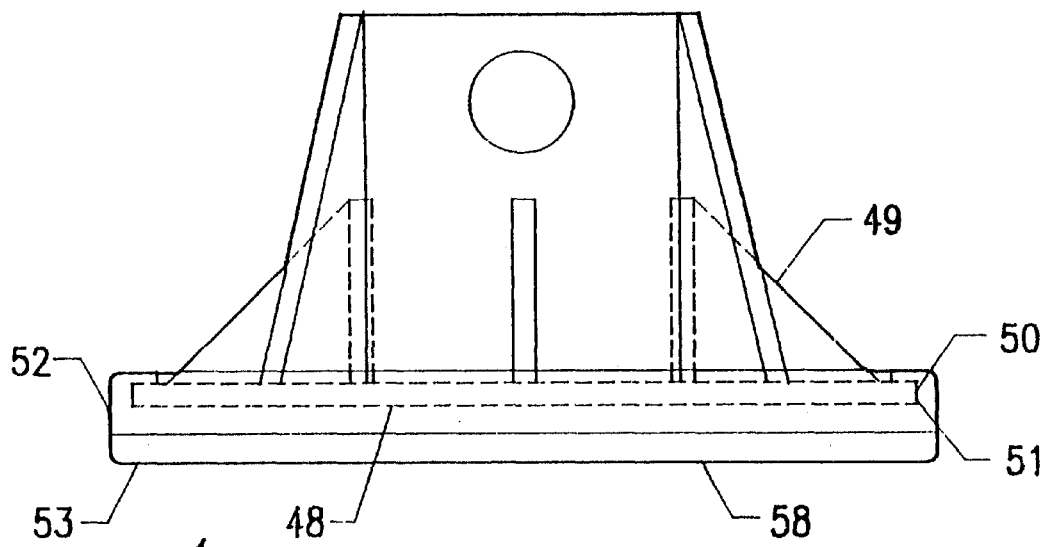
FIG. 12 is a left side view of FIG. 11.

In FIGS. 11 and 12 an embodiment 47 is shown having a circular lower portion 48, a pattern of vertical reinforcing ribs 49 and a laminar compressible pad 58 attached to the circular lower portion 48. The pad 58 has an annular groove 50 which engages an outer edge 51 of the circular lower portion 48. The laminar pad 58 is comprised of a lower 52 and upper layer of compressible materials of different durometers. The durometer of the lower layer 52 is preferably less than the durometer of the upper layer 53 such that the lower layer 52 yields when small obstacles are encountered and both layers yield when larger obstacles are encountered.

It will be made apparent from the preceding description that the objects of the invention are efficiently attained. Since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In combination with a semitrailer landing gear of the type having a pair of pavement engaging shoes connected to lower end portions of a pair of slender vertical members, a means for reducing the stresses in a pavement due to the contact of said landing gear pavement engaging shoes with said pavement comprising: an enlarged ground engaging base plate attached in fixed non-movable relations to a bottom surface of each of said landing gear shoes, each of said enlarged base plates having a perimeter spaced outwardly away from a perimeter of one of said landing gear pavement engaging shoes; and means for attaching each of said enlarged ground engaging base plates in said fixed, non-movable relationship to one of said landing gear shoes.

2. The combination set forth in claim 1 further comprising a compressible pad attached to a bottom surface of each of said enlarged base plates.

3. The combination set forth in claim 1 wherein each of said auxiliary base plates is a generally rectangular plate.

4. The combination set forth in claim 1 wherein each of said auxiliary base plates is a generally circular plate.

5. The combination set forth in claim 1 wherein said resilient pad is a rubber pad.

6. In combination with a semitrailer landing gear of the type having a pair of pavement engaging shoes connected to lower end portions of a pair of slender vertical members, a means for reducing the stresses in a pavement due to the contact of said landing gear pavement engaging shoes with said pavement comprising: an enlarged ground engaging base plate attached to a bottom surface of each of said landing gear shoes, each of said enlarged base plates having a perimeter spaced outwardly away from a perimeter of one of said landing gear pavement engaging shoes; a means for attaching each of said enlarged ground engaging base plates to one of said landing gear shoes; and a resilient urethane pad attached to a bottom surface of each of said enlarged base plates.

7. The combination set forth in claim 2, wherein said resilient pad is a laminar pad.

8. In combination with a semitrailer landing gear of the type having a pair of pavement engaging shoes connected to lower end portions of a pair of slender vertical members, a means for reducing the stresses in a pavement due to the contact of said landing gear pavement engaging shoes with said pavement comprising: an enlarged around engaging base plate attached to a bottom surface of each of said landing gear shoes, each of said enlarged base plates having a perimeter spaced outwardly away from a perimeter of one of said landing gear pavement engaging shoes and; a pair of brackets for clamping each of said base plates to one of said landing gear shoes.

9. In combination with a semitrailer landing gear of the type having a pair of pavement engaging shoes connected to lower end portions of a pair of slender vertical members, a means for reducing the stresses in a pavement due to the contact of said landing gear pavement engaging shoes with said pavement comprising: an enlarged ground engaging base plate attached to a bottom surface of each of said landing gear shoes, each of said enlarged base plates having a perimeter spaced outwardly away from a perimeter of one of said landing gear pavement engaging shoes; a means for attaching each of said enlarged ground engaging base plates to one of said landing gear shoes; and a compressible laminar pad attached to a bottom surface of each of said enlarged base plates which are attached to said shoes comprised of a higher durometer upper layer and a lower durometer lower layer.

10. A method for reducing the stresses in a road pavement due to a contact of a pair of pavement engaging shoes of a semitrailer landing gear with said pavement comprised of the step of attaching a pair of enlarged ground engaging base plates in fixed non-moveable relationship to bottom surfaces of said pair of landing gear pavement engaging shoes.

11. The method as recited in claim 10 further comprising the step of further reducing said stresses of said landing gear shoes in said pavement by mounting a compressible pad on a bottom surface of each of said enlarged base plates.

12. In a semitrailer landing gear of the type having a pair of pavement engaging shoes connected to lower end portions of a pair of slender vertical members, the improvement comprising an enlarged pavement engaging base plate attached to a bottom surface of each of said pavement engaging shoes for reducing the stresses in a pavement due to the contacts of said pair of pavement engaging shoes, said pavement engaging base plates having perimeters spaced outwardly away from perimeters of said pavement engaging shoes; and means for clamping said base plates in fixed non-moveable relationship to said pavement engaging shoes.

13. In combination with a semitrailer landing gear of the type having a pair of pavement engaging shoes connected to lower end portions of a pair of slender vertical members, a means for reducing the stresses in a pavement due to the contact of said landing gear with said pavement comprising: an enlarged auxiliary shoe attached to a lower surface of each of the said landing gear pavement engaging shoes, each of said auxiliary shoes comprised of an enlarged base plate having a perimeter spaced outwardly substantially away from a perimeter of one of said landing gear pavement engaging shoes; a means for clamping said auxiliary shoes to said landing gear pavement engaging shoes, said means including brackets having outer end portions attached to said enlarged auxiliary shoes and inner end portions extending over upper surfaces of said landing gear pavement engaging shoes.

14. The combination set forth in claim 13 further comprising a resilient pad attached to a bottom surface of each of said enlarged plates.

15. The combination set forth in claim 14 wherein said resilient pad is a laminar pad having a higher durometer upper layer and a lower durometer lower layer.

\* \* \* \* \*

UNITED STATES PATENT AND TRADEMARK OFFICE
CERTIFICATE OF CORRECTION

PATENT NO. : 6,231,081 B1  
DATED : May 15, 2001  
INVENTOR(S) : Joseph J. Berke and Charles T. Michael It is certified that error appears in the above-identified patent and that said Letters Patent is hereby corrected as shown below:

<u>Column 4,</u>  
Line 3, change "relations" to -- relationship --  
Line 39, change "around" to -- ground --

Signed and Sealed this

Eleventh Day of September, 2001

*Attest:*

NICHOLAS P. GODICI  
*Attesting Officer*  *Acting Director of the United States Patent and Trademark Office*